United States Patent [19]
Flaherty

[11] Patent Number: 5,975,747
[45] Date of Patent: Nov. 2, 1999

[54] OVERFILL COMPENSATION FOR A BATCH DELIVERY SYSTEM

[75] Inventor: Dennis Thomas Flaherty, Lafayette, Colo.

[73] Assignee: Micro Motion, Inc., Boulder, Colo.

[21] Appl. No.: 08/864,639

[22] Filed: May 29, 1997

[51] Int. Cl.⁶ .............................. G06F 17/00; B67D 5/30
[52] U.S. Cl. ................... 364/479.1; 364/479.14; 222/14; 222/59
[58] Field of Search ................ 364/479.01, 479.1, 364/479.14, 528.17, 528.18; 222/20, 21, 22, 40, 59, 14, 63, 36

[56] References Cited

U.S. PATENT DOCUMENTS

| | | |
|---|---|---|
| 4,953,751 | 9/1990 | Shannon .................................. 222/40 |
| 5,249,129 | 9/1993 | Lamoureux et al. ................... 364/479 |
| 5,316,181 | 5/1994 | Burch ........................................ 222/61 |
| 5,431,302 | 7/1995 | Tulley et al. ............................. 222/14 |

FOREIGN PATENT DOCUMENTS

| | | |
|---|---|---|
| 0414364A1 | 7/1990 | European Pat. Off. . |
| 3236630A1 | 4/1984 | Germany . |

Primary Examiner—William Grant
Assistant Examiner—Steven R. Garland
Attorney, Agent, or Firm—Duft, Graziano & Forest, P.C.

[57] ABSTRACT

A batch delivery system that provides material overfill compensation to deliver a precise amount of material from a source to a destination. Data including the mass flow rate, the estimated overfill and the actual overfill is recorded for a plurality of batches to determine an estimated overfill for a subsequent batch. The system can also detect possible malfunction of a flow control means such as a valve or a pump.

19 Claims, 8 Drawing Sheets

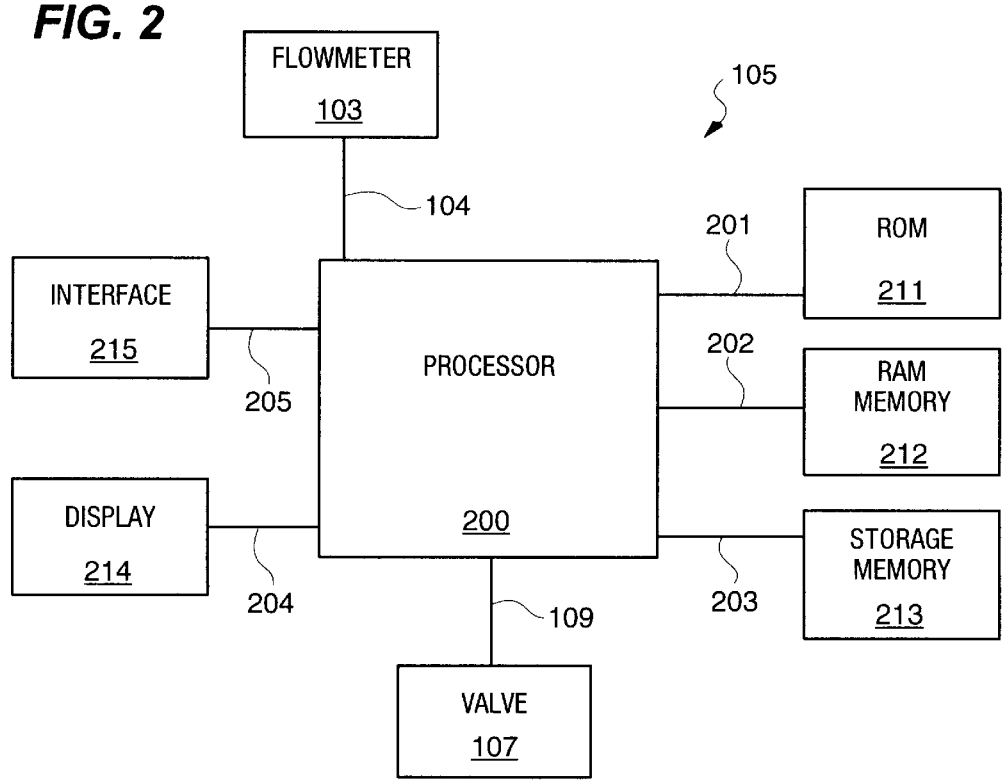

OVERFILL COMPENSATION FOR A BATCH DELIVERY SYSTEM

FIELD OF INVENTION

This invention relates to a batch delivery system, and in particular, to a batch delivery system having automatic overfill compensation to deliver a predetermined precise amount of material from a material source to a material destination.

PROBLEM

Batch delivery systems are known in which material is delivered from a material source to a material destination by means of automated equipment that controls and monitors the amount of material delivered. Batch delivery systems are further known in which a predetermined amount of material is delivered from a source to a destination with precision so as to minimize the amount of overfill or underfill of the delivered material.

Batch control systems are used in industrial processes in which the amount of material delivered must be controlled with precision so as to minimize both underfill as well as overfill of the delivered material amount. An uncontrolled amount of overfill is undesirable since it results in a waste of the delivered material; the overfill of delivered material may be dangerous if the material is of the hazardous type; the overfill can be costly to the seller of the delivered material in applications in which the customer is delivered is willing to pay only for the amount of material specified and agreed to in advance.

In other applications, particularly those involving costly material, an overfill represents an economic waste. In other situations involving costly material, an underfill may result in the waste of the entire batch of delivered material. One such example might be photographic film manufacturing where the delivered material is silver and an underfill would cause an insufficient amount of silver to be deposited on the film so that the entire batch of film would be useless for its intended purpose.

Underfill is also undesirable in many applications. The most obvious such application is one in which the customer to whom the material is delivered has specified a predetermined amount of material to be delivered and for which he is willing to pay. Any underfill represents a material shortage with the customer being billed or charged for material not delivered.

Attempts have been made to compensate for the overfill or underfill manually by relying on estimates based upon experience derived from prior underfills or overfills. For example, if it is desired to deliver 100 gallons and if experience shows that an overfill of 1 gallon occurs if the controlling valve is shut off when the 100 gallon receptacle is filled, it is then relatively easy to compensate for this by sending a signal to close the valve when 99 gallons have been delivered so that the 99 delivered gallons plus the predicted 1 gallon of overfill totals the desired 100 gallons to be delivered. Such an arrangement is shown in U.S. Pat. No. 5,431,302 to Tulley et al. which discloses a beer dispensing system which minimizes overspill by accumulating and storing overspill data from previous dispensing operations. The stored data is used on the next operation to calculate a more accurate estimated overfill. However, the techniques shown by Tulley et al. are satisfactory only in those situations where all conditions are constant including the material flow rate. A variation in any of these parameters, such as mass flow rate, would still generate undesired overfill or underfill. This is particularly applicable in situations in which the mass flow rate is not constant and varies as gravity is used to transfer material from a fluid source to a fluid destination.

It can therefore be seen that it is a problem to transfer a precise amount of material from a material source to a material destination so that only the specified quantity of materials is delivered with a minimum of overfill or underfill.

SOLUTION

The above and other problems are solved by the system of the present invention which enables a precise amount of material to be transferred from a material source to a material destination with a minimum amount of overfill or underfill. In accordance with the present invention, automated control equipment, including a flowmeter and a remotely controlled valve are placed in series with the path over which the material is delivered to the destination. The system includes further automated control equipment termed a batch controller which receives flow rate information pertaining to the delivered material and processes this information to ascertain the characteristics of the flow system being controlled. The batch controller uses the processed information to close the valve at the time required to achieve a material delivery that has a minimum of underfill or overfill.

The system comprising the present invention functions by delivering a number of trial batches to ascertain the operational characteristics of the controlled system. In these trial runs, the batch size of the delivered material is specified as is the number of trials to be executed. Following this, statistics are collected for the trial batches with these statistics including the material flow rate and the overfill/underfill achieved for each trial run. After the specified number of trials are run, the trial data is accumulated and stored. The stored trial data enables an estimation to be made of the overfill/underfill to be expected for various operational conditions, that can be similar to or significantly different from the conditions pertaining to the trial runs.

Subsequently, material is delivered in production batches with each batch having associated with it data specifying the size of the batch to be delivered. Instrumentation that includes a material flowmeter in the delivery line transmits data to a batch controller. The batch controller uses this data including the stored estimation of the overfill/underfill to deliver a batch to the destination having a magnitude equal to the specified desired value of the batch.

As the delivery for a batch is in progress, the batch controller receives flow rate information from a flowmeter and accumulates the magnitude of the material delivered with respect to time. This determination is made by multiplying the measured flow rate by the accumulated delivery time for the batch. This process continues until the total material amount delivered approaches the target amount of material to be delivered for the batch. At this time, the batch controller uses the estimated overfill data to send a signal to the control valve to shut it off a short time prior to the actually delivery of the end target amount of the batch. The control valve takes a finite amount of time to shut off after receiving the closure signal from the batch controller. Also, after the valve is shut off, a finite amount of material is in the delivery path to the destination. The cumulative effects of this remaining material and the closure time of the valve is compensated for by the overfill estimation data so that by the time the control valve is finally closed and by the time the material yet in the delivery path reaches a destination, the total amount of material delivered for the batch will be close to that of the target amount with a high degree of precision.

As priorly mentioned, the system comprising the present invention performs a number of trial batch runs before beginning the processing of production batches. The purpose of performing the trial batches is to derive information that enables the system to estimate with precision the overfill information that is subsequently used for processing production batches. The process of running a plurality of trial batches involves specifying the number of trial batches to be run, storing flow rate and other information for each trial batch and, from the storage of this information for the plurality of trial batches, deriving the overfill information to be used on the actual batches to be processed.

Still more specifically, the stored information that is derived and stored for the trial batches includes the flow rate for each batch and the derived or computed amount of overfill. Further information is derived by dividing the overfill amount by the flow rate to derive and store a ratio for each trial batch. The information further includes the computation of the average and standard deviation of the various ratios derived for each batch. Finally, the stored information further includes the use of the average ratio as a linear factor in deriving an estimation function which is subsequently used in the processing of actual batches.

The process of the present invention is further useful in determining a possible malfunction or incipient malfunction of the control valve. For example, the control valves used in the delivery system of the present invention take a finite amount of time to close following the receipt of a closure signal. This time may be in the order of 5–10 seconds. The processing of the trial batches enables the system controller to take into account the closure time of the control valve. The closure time of the control valve is involved in material overfill since material can flow through the valve for the 5–10 second interval required for the valve to close. The batch controller of the present invention accumulates this information regarding the characteristics of the valve so that if the valve should subsequently change characteristics and take a far longer time to close, this can be determined by the batch controller since the overfill will be substantially more than it was when the valve was operating properly. From this information, the batch controller is able to determine that the control valve is taking longer to close following the receipt of a closure signal. From this, the batch controller is able to generate an alarm, or other appropriate signal, to alert the system operators of a possible malfunction of the system control valve.

DESCRIPTION OF THE DRAWINGS

The above and other advantageous features of the invention may be better understood from a reading of the following detailed description thereof taken in conjunction with the drawings in which:

FIG. 2 is a block diagram of a batch controller;

FIG. 10 is a block diagram of a data structure for storing test data.

DETAILED DESCRIPTION

Figure 1:
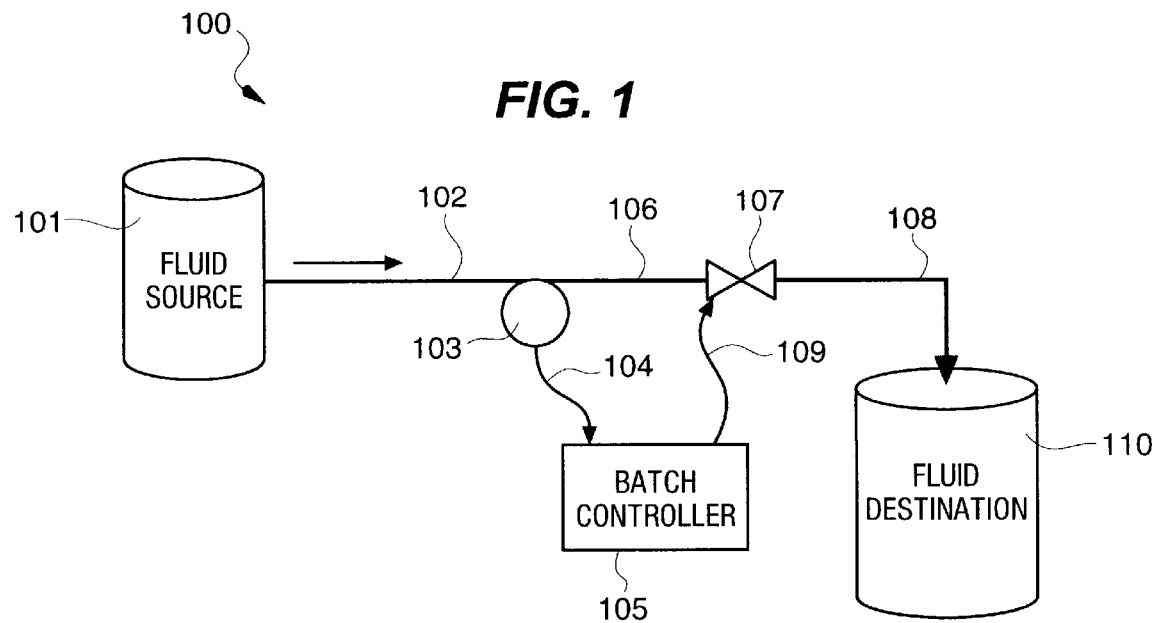
FIG. 1 is a block diagram of a batching system.

FIG. 1 illustrates the batch delivery system 100 comprising one possible exemplary embodiment of the present invention. Material is received from fluid source 101 and applied to flowmeter 103 over path 102. Valve 107 receives the material from flowmeter 103 via path 106. Element 107 may alternatively be a pump. The material flows from valve 107 to fluid destination 110 via path 108. Batch controller 105 monitors and controls the flow of material through batch delivery system 100. Flowmeter 103 sends flow information to batch controller 105 via path 104. When batch controller 105 determines that the specified amount of material has passed through flowmeter 103, batch controller 105 sends a signal over path 109 to close valve 107. The present invention comprises a method for generating an overfill estimator function, which determines the amount of overfill material that will flow through valve 107 between the time that the terminate flow signal is transmitted by batch controller 105 and the time that valve 107 closes. Batch controller 105 uses the estimate to determine when the terminate flow signal is transmitted to valve 107 to prevent overfilling destination 110 past a target amount.

Batch controller 105 is illustrated in block diagram form in FIG. 2. Processor 200 controls the flow of material in batch delivery system 100 by executing instructions read from Read Only Memory (ROM) 211 over bus 201. In order to execute these instructions, processor 200 reads data from and writes data to Random Access Memory (RAM) 212 over bus 202. Data that is stored for use in future estimations is written to and read from memory 213 via bus 203.

Processor 200 opens and closes valve 107 by transmitting signals to valve 107 via path 109. Processor 200 can generate display data about the batching process and transmit the data to display 214 over video bus 204. Display 214 is a monitor or equivalent device that can display the display data generated by processor 200. Interface 215 is a keyboard or other such device that allows a user to input data to processor 200 over bus 205.

Figure 3:
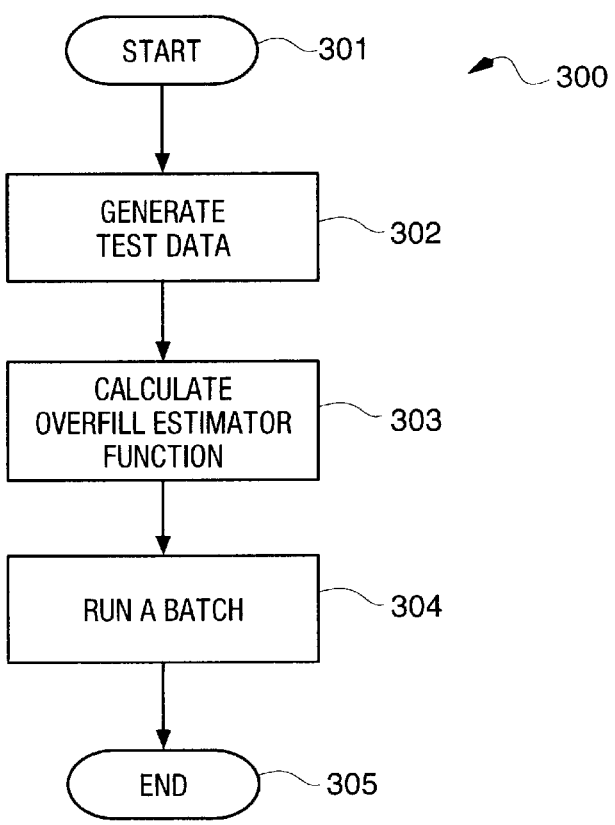
FIG. 3 is a flow chart of the steps of a preferred embodiment of the system.

FIG. 3 is a flow chart that gives an overview of all of the processes executed by processor 200 in the preferred embodiment of the present invention. Overview process 300 starts at step 301. In step 302, test data is generated and stored for future use in determining an overfill estimator function. Step 303 uses the test data generated and stored in step 302 to calculate an overfill estimator function. Step 304 uses the estimator function determined in step 303 to run a batch and estimate the proper time to close valve 107 to prevent overfill. Each of the steps 302–304 are described in detail below.

Figure 4:
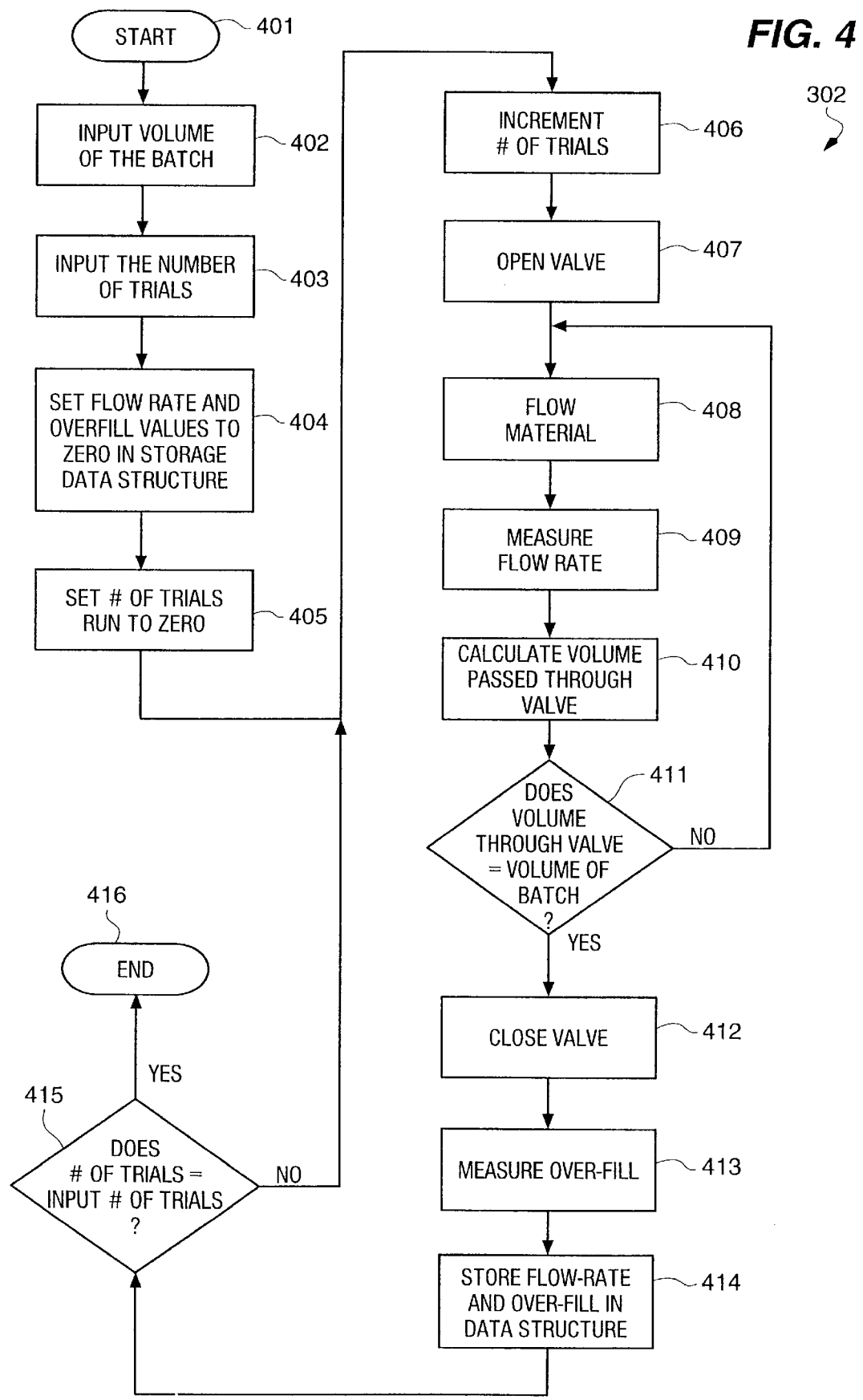
FIG. 4 is a flow chart of a method for generating test data.

A flow chart of the process of step 302 is illustrated in FIG. 4 Process 302 starts in 401. In step 402, a user inputs the volume of the trial batch. The input volume is a target amount of material that processor 200 attempts to deliver to destination 110. The user inputs the target batch volume with interface 215. The input volume is sent to processor 200 over bus 205 and stored in RAM 212 for future use. Step 403 receives a user input of the number of trials to run which is also stored in RAM 212 for future use. In step 404, processor 200 initializes all of the values in an overfill data structure 1000 (FIG. 10) to zero. The initialization assures that no unwanted values are used in calculating the overfill estimator function. Step 405 sets the number of trials run to zero and batch system 100 is prepared to perform the trial batches.

The data collected from the trial batches is stored in data structure 1000 illustrated in FIG. 10. Each of the rows 1001 contains the data from one trial run of a batch. The flow rate of the material through flow meter 103 for the batch is recorded in column 1002. The overfill amount of the batch is stored in column 1003. The ratio of overfill/flow rate is calculated later in process 303 and stored in column 1004. An average ratio is also calculated in process 303 and stored in 1005. The standard deviation of the measured ratios from the average ratios is stored in 1006.

Process 302 continues as illustrated in FIG. 4 by running the individual trials in the following manner. First, step 406 increments the number of trials run. In step 407, processor 200 sends a begin material flow signal to open valve 107. The material flows through the valve to destination 110 in step 408. Flowmeter 103 measures the flow rate of the material flowing though batching system 100. The measured flow rate is received by processor 200 from flowmeter 103 over path 104 in step 409. Processor 200 uses the flow rate to calculate how much material has passed through the valve in step 410. In step 411, processor 200 determines if the volume that has passed through the valve is equal to the input volume of the batch. If the two volumes are not equal, steps 408–411 are repeated.

When the volume that has passed through the valve is equal to the input batch volume, processor 200 executes step 412 and transmits a terminate material flow signal to valve 107 via path 109. Valve 107 closes when the termination signal is received and the overfill amount is measured in step 413. Processor 200 executes step 414 to store the flow rate and overfill of the trial in the overfill data structure 1000. Step 415 determines if the number of trials is equal to the input number of trials. If the two numbers are equal, the process is completed and ends in step 416. Otherwise, another trial is performed starting with step 406. The batch trials should be run a number of times to improve the accuracy of the fit of the estimator function.

Figure 5:
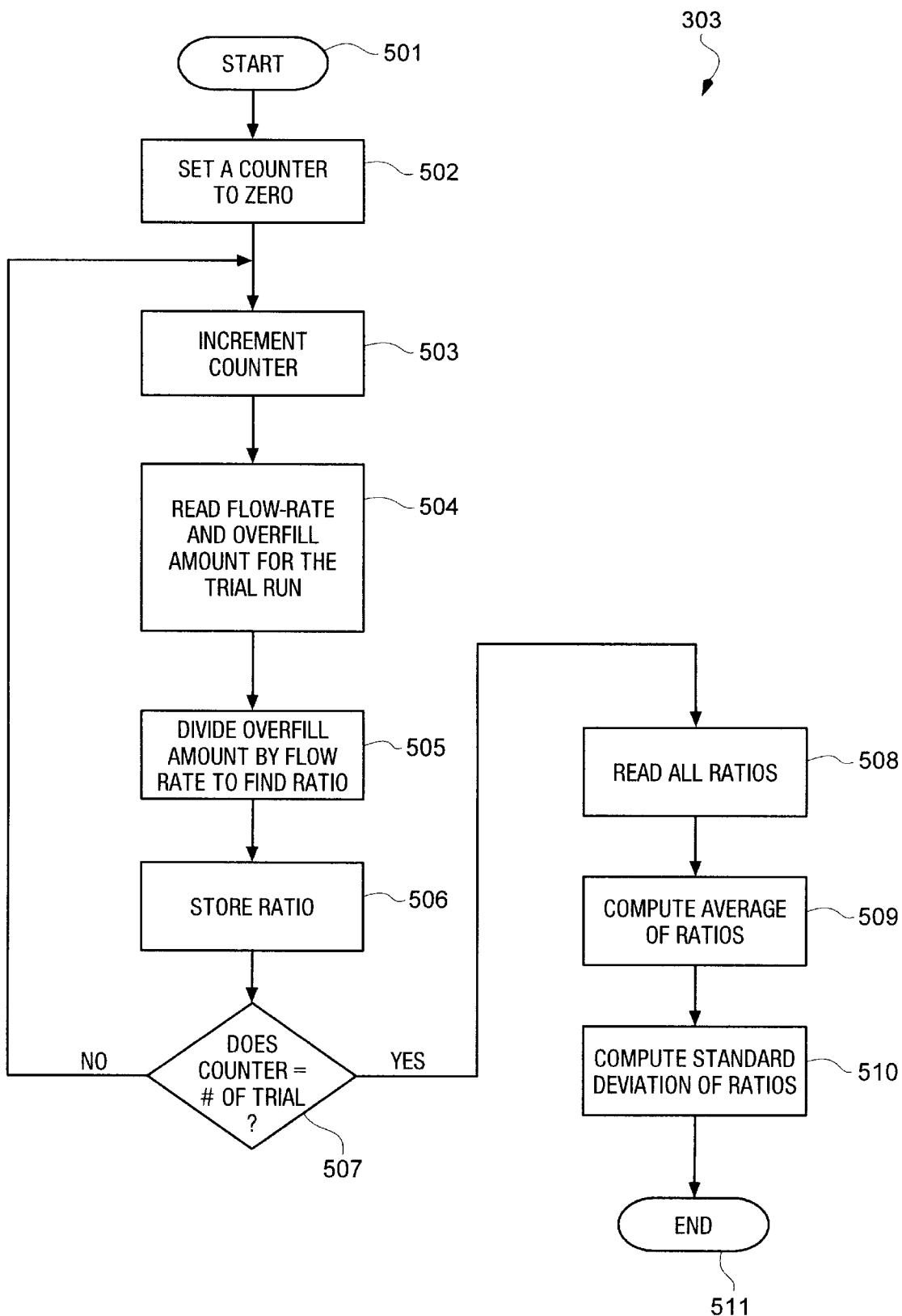
FIG. 5 is a flow chart of a preferred method for determining an overfill estimator function.

FIG. 5 illustrates process 303 which generates an overfill estimator function from the stored flow rates and overfill amounts. The following generates a linear function. However, any other method for generating a function from trial data can be used. Step 501 begins process 303. In step 502, processor 200 sets a counter to zero. The counter is used to determine when process 303 is completed.

Step 503 increments the counter to indicate the iteration of the process currently being completed. In step 504, processor 200 reads the flow rate and the overfill amount for a trial batch from data structure 1000. Processor 200 divides the overfill amount by the flow rate to find a ratio of overfill amount/flow rate in step 505 and the ratio is then stored to memory in step 506. A determination of whether the counter equals the total number of trials is made by processor 200 in step 507. The number of trials to be run is entered into element 507 from element 403 on FIG. 4. If the counter and number of trials are not equal, steps 503–507 are repeated.

When the counter and number of trials are equal, step 508 has processor 200 reads all of the ratios that have just been calculated. In step 509, processor 200 computes the average of the read ratios. The average of the ratios is stored in 1005 of data structure 1000. The average is used to compute the standard deviation of each ratio in step 510 and process 303 ends in step 511. The average ratio is used as an estimator function in step 304 to estimate the amount of overfill during a batch.

Figure 8:
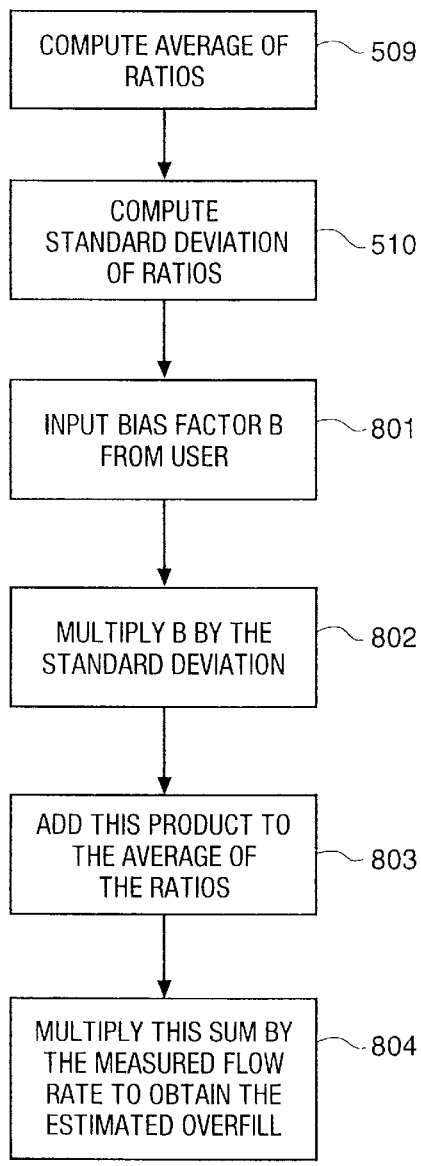
FIG. 8 is a flow chart of additional steps in the preferred method of generating an overfill estimator function to improve accuracy.

FIG. 8 illustrates the additional steps of process 303 that can be executed by processor 200 to improve the accuracy of the estimator function. The accuracy is improved by adding a bias factor to the average ratio. A continuation of FIG. 5 is shown by FIG. 8 in steps 509 and 510. Processor 200 receives an input of a bias factor, b, from the user in step 801. Step 802 multiplies the bias factor, b, by the standard deviation computed in step 510. The product of step 802 is added to the average of the ratios in step 803 to find the estimator function to be used in step 304 to run a batch.

Figure 9:
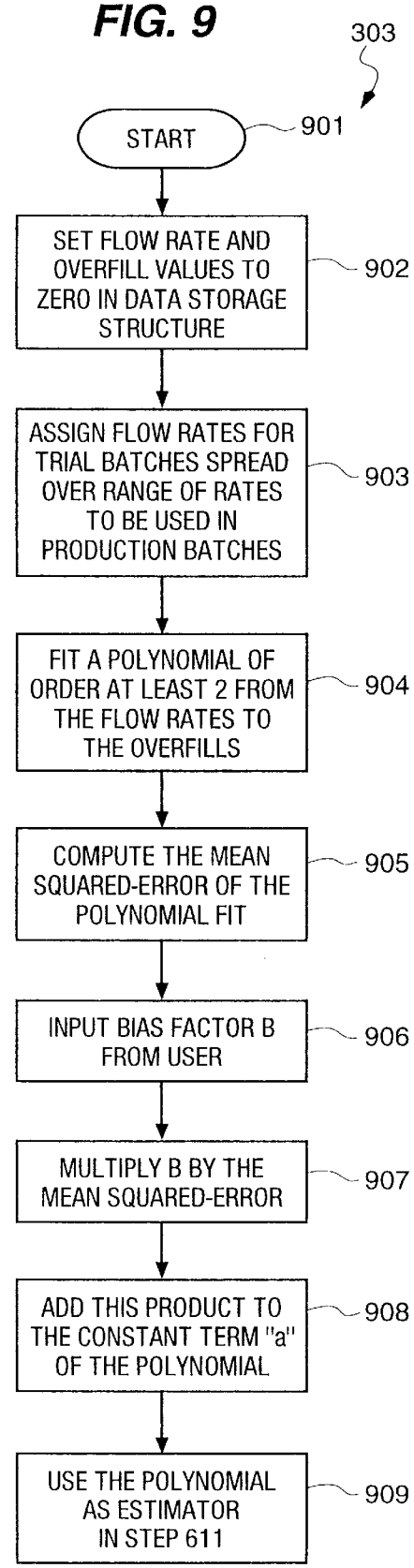
FIG. 9 is an alternative method for generating an overfill estimator function.

FIG. 9 illustrates another embodiment of process 303. The process in FIG. 9 finds the estimator function by determining the best polynomial fit of the data. A polynomial function is typically more accurate than a linear relation as shown in the first embodiment of FIG. 5. The second embodiment of process 303 begins in step 901. In step 902, processor 200 sets the values in data structure 1000 to zero. Step 903 assigns flow rates to the trial batches that are spread over a range of flow rates to be used in production batches to produce data that will produce an accurate polynomial fit. Process 303 continues in FIG. 9 with processor 200 fitting a polynomial of the order of at least two from the flow rates to the overfill amounts in step 904. After a polynomial has been found, step 905 computes the mean squared-error of the polynomial fit. Processor 200 receives an input bias factor, b, from the user in step 906. Step 907 multiplies the bias factor, b, by the mean squared-error. The product of step 907 is added to the constant term "a" of the polynomial in step 908. Element 909 uses the polynomial as the estimator function in element 611 of process 304.

Figure 6:
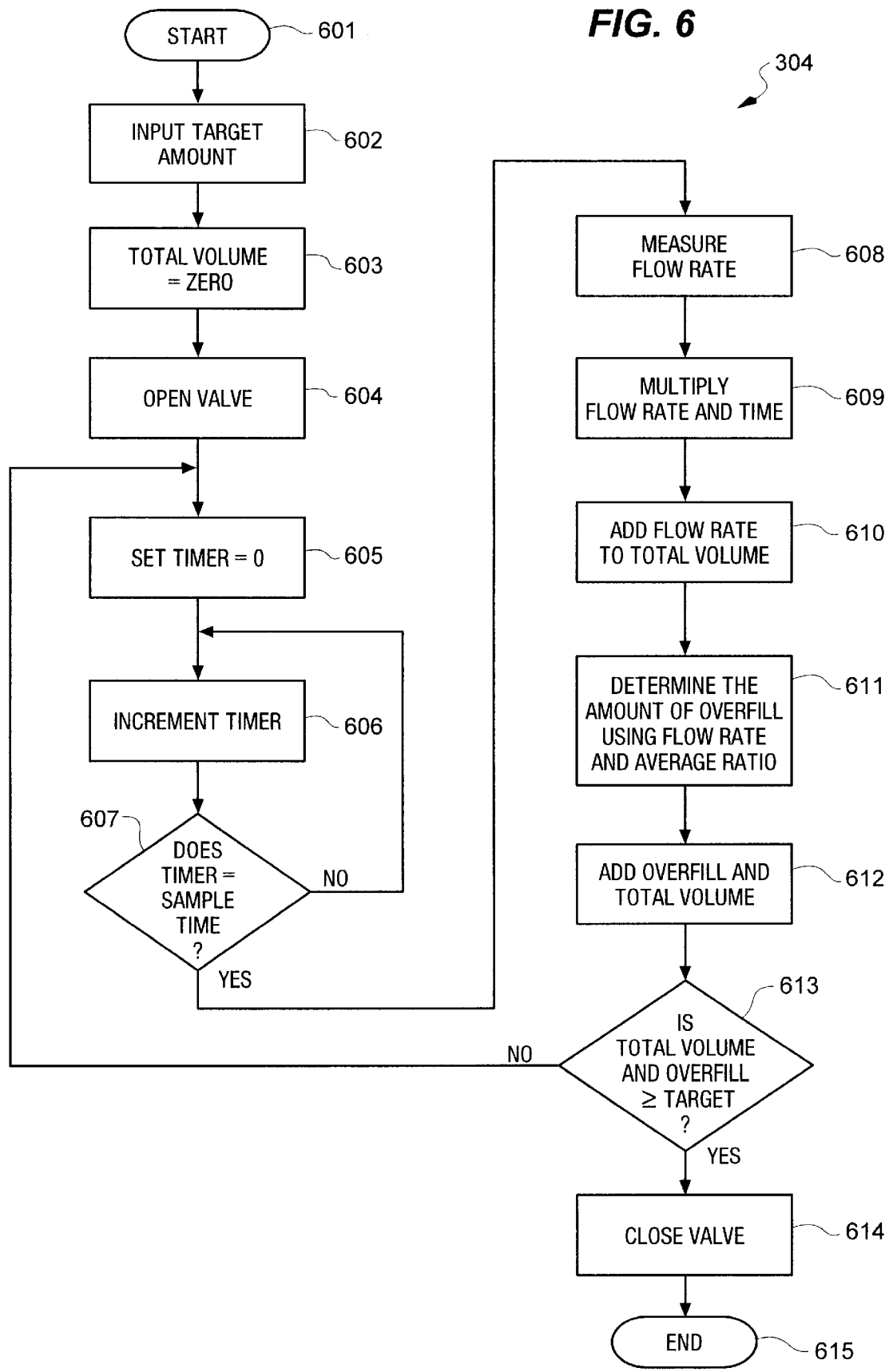
FIG. 6 is a flow chart of a method for using the overfill estimator function to prevent overfill of a batch.

FIG. 6 illustrates process 304 which runs a batch and estimates the overfill amount to avoid an overfilling of material destination 110. Process 304 starts in step 601. In step 602, processor 200 receives a user input of a target amount from interface 215 over bus 205. The total volume of the batch is set equal to zero before filling begins in step 603.

Processor 200 transmits a begin material flow signal to valve 107 via path 109 in step 604. Valve 107 opens responsive to receiving the signal. In step 605, processor 200 sets a timer to zero. The timer is incremented in step 606 and step 607 determines if the timer is equal to a measurement time. If the two are not equal, steps 606 and 607 are repeated.

When the timer equals the measurement time, process 304 continues to step 608, which measures the flow rate. Flowmeter 103 measures the flow rate of the material flowing to valve 107. The measure flow rate is received by processor 200 over path 104. Processor 200 multiplies the flow rate and the measurement time in step 609 to determine the amount of material that passed through the valve during the measurement time. The determined amount of material is added to the total volume of the batch in step 610 to indicate the current amount of material in destination 110. Step 611 determines the amount of overfill using the estimator function determined in process 303. In the preferred embodiment, the estimated overfill is determined when the average ratio found in step 509 of process 303 is multiplied by the measured flow rate. In the second embodiment, the flow rate is placed in the polynomial to determine an overfill estimate. The result is the estimated amount of overfill at the present flow rate.

In step 612, the estimated overfill is added to the total volume. Step 613 determines whether the added total volume and estimated overfill are greater than or equal to the input target amount. If estimated overfill and total volume are less than the target amount, steps 605–613 are repeated. If the estimated overfill and total volume are at least equal to the target amount, processor 200 transmits a close valve signal to valve 107 via path 109 in step 614. Valve 107 closes when the close valve signal is received and process 304 ends in step 615.

Figure 7:
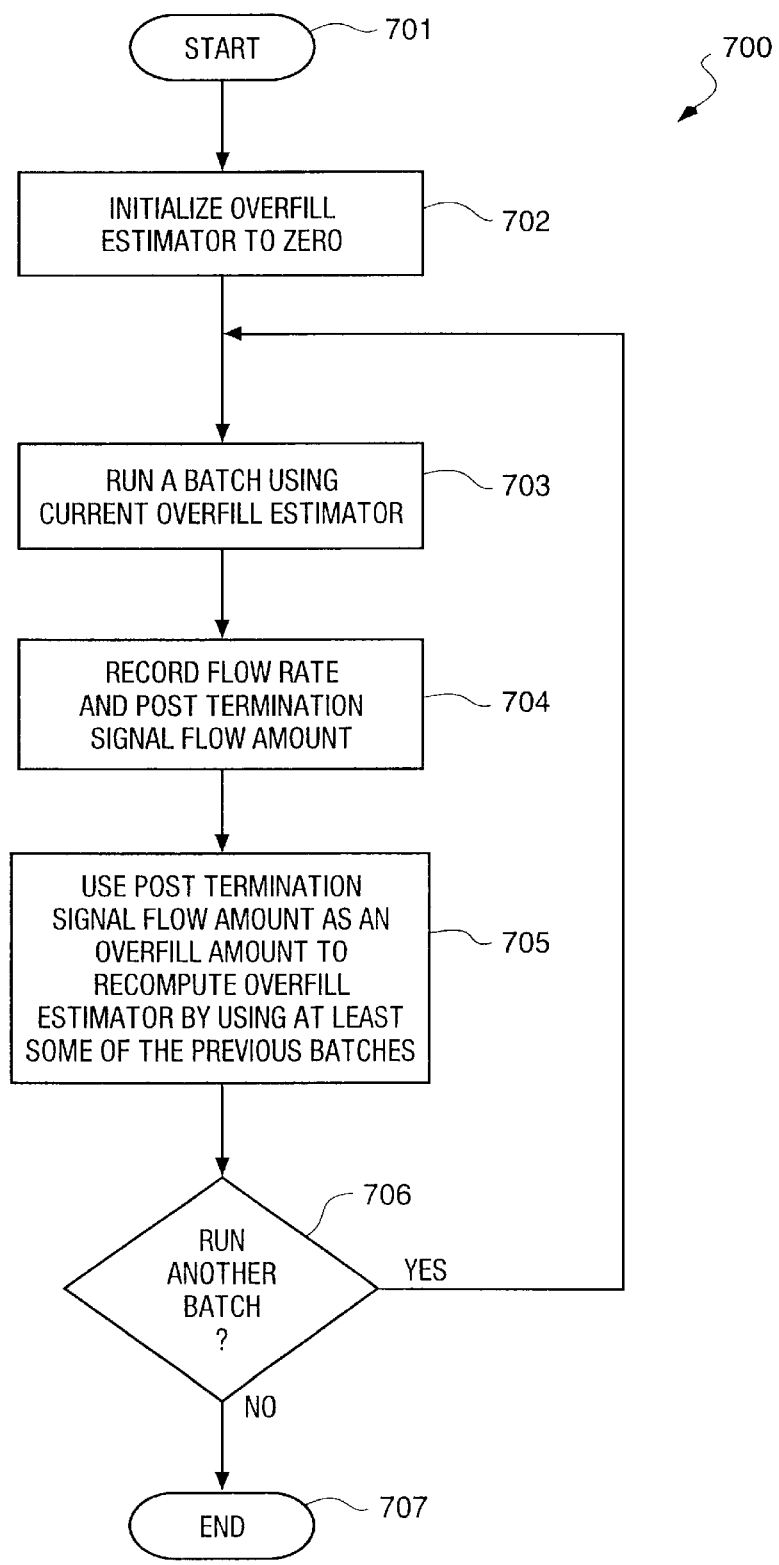
FIG. 7 is a flow chart of an alternative method of obtaining test data to provide an estimator function.

A second embodiment of the present invention uses the flow and overfill from previous batches to generate the data needed to determine the estimator function. FIG. 7 illustrates the second embodiment. Process 700 starts in step 701. In step 702 processor 200 initializes the overfill estimator function to zero. This produces a constant overfill estimate of zero for the first batch run, and another reasonable estimator function can be chosen as a matter of design choice.

Step 703 runs a batch using the overfill estimator function. In step 704, processor 200 records flow rate of the batch run in step 703 and the overfill amount of the batch in memory. In the preferred second embodiment, the flow rate and overfill amount are stored in data structure 1000 (FIG. 10) in the place of the least recent batch. Process 600 keeps data for only the most recently run batches.

The flow rate and the overfill from the completed batch are then used to compute a new estimator function in step 705. In the preferred second embodiment, step 705 is completed by applying process 303 to the data structure 1000 containing the newly recorded data. The estimator is constantly recalculated to keep the estimation as accurate as possible. A user is alerted immediately of a problem if the estimator function rapidly changes. Step 706 determines if another batch must be run. If another batch must be run step 703–706 are repeated. Otherwise, process 700 ends in step 707.

The present invention also provides for the detection of a possible malfunction of the flow valve 107 or other flow control means such as a pump in lieu of valve 107. A possible malfunction would be an increased closure time of a valve or an increased response by the flow control means following the receipt of a flow termination signal.

Figure 11:
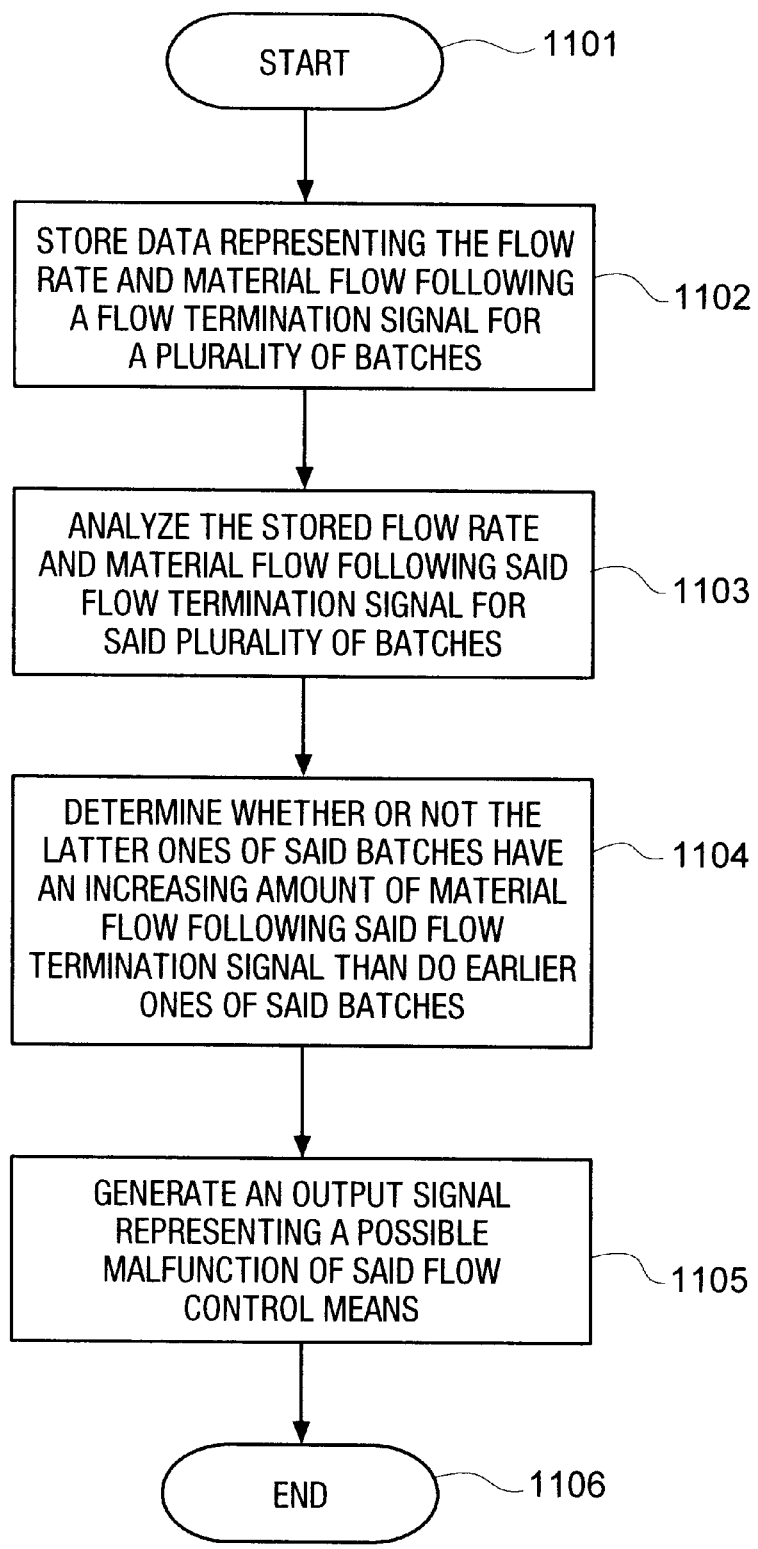
FIG. 11 is a block diagram of a method for detecting a possible malfunction of a material flow controller.

The process is illustrated by the flow chart of FIG. 11 where element 1101 is the start of the process. Element 1102 stores data representing the flow rate and material flow following the receipt of a flow termination signal for a plurality of batches as illustrated on FIG. 10. Next, element 1103 analyzes the stored flow rate and material flow data following the receipt of the flow termination signal for the plurality of batches. Element 1104 determines as a result of the analyses, whether or not the latter ones of the plurality of batches have an increasing amount of material flow following the receipt of the flow termination signal then do the earlier ones of the batches. In response to the determination of step 1104, step 1105 generates an output signal representing a possible malfunction of the flow control means. Element 1106 terminates the process.

The above described invention relates to estimating the overfill of a batch to prevent excess material from being delivered to the destination. Although specific embodiments are disclosed for example herein, it is expected that people skilled in the art can and will design alternative methods for generating an overfill estimator function that is within the scope of the following claims either literally or through the doctrine of equivalents. For example, element 107 may be a valve or a pump which can be controlled to start/stop material flow.

I claim:

1. A method of operating a material delivery system for delivering material from a material source to a material destination, said system comprising the steps of:

running n batches in which material is delivered from said source to said destination;

measuring the flow rate of said material for each one of said n batches during the running of each one of said n batches where the measured flow rate can be of any value;

measuring the material overfill amount for each batch of said n batches during the running of each said batch;

accumulating and recording data including the measured flow rate for each of said n batches and the measured material overfill amount for each of said n batches;

running at least one subsequent batch;

specifying a target amount of material to be delivered for said at least one subsequent batch;

measuring the flow rate for said at least one subsequent batch during the running of said at least one subsequent batch where said measured flow rate for said subsequent batch can be of any value;

using said recorded data and the recorded flow rates for said n batches to determine an estimated material overfill amount for said measured flow rate for said at least one subsequent batch;

subtracting said estimated material overfill amount for said at least one subsequent batch from said target amount to derive a material flow termination signal amount; and terminating said material flow in response to the deriving of said termination signal amount to deliver said target amount of material to said destination.

2. The method of claim 1 wherein the step of running said at least one subsequent batch further comprises the steps of:

accumulation and recording data including said measured flow rate and a post termination material amount for said subsequent batch comprising the difference between the final amount of material delivered for said subsequent batch and the material flow termination signal amount of material;

using said recorded data for determining an estimated overfill amount for said subsequent batch for any flow rate.

3. The method of claim 1 wherein said step of running said n batches further comprises the steps of:

specifying that n batches are to be run;

specifying a batch size for each of said n batches to be run;

running a first one of said n batches;

measuring the flow rate and material overfill for said first one of said n batches; and running the remainder of said n batches while measuring the flow rate and material overfill for each remaining ones of said n batches.

4. The method of claim 1 wherein step of determining an estimated overfill amount for each batch of said plurality of n batches further comprises the steps of:

dividing the material overfill amount for each batch of said n batches by the measured flow rate for each batch to determine a ratio for each batch;

storing the ratio for each batch;

computing the average of said stored ratios, wherein said method of determining said estimated overfill for said subsequent batch comprises the step of using said average to obtain said estimated material overfill amount for said subsequent batch by multiplying the average of said ratios by a measured flow rate for said subsequent batch.

5. The method of claim 4 wherein said method of running at least one subsequent batch further comprises the steps of:

activating a control means to start the flow of said material from said source to said destination;

repeatedly measuring the flow rate of said material at predetermined time increments;

determining an incremental material delivered flow amount by multiplying said flow rate by a said time increment;

adding said incremental material delivered flow amount to a totalizer;

estimating the material overfill for said measured flow rate by multiplying the measured flow rate by said average of said ratios;

subtracting said estimated material overfill from said material target amount to derive a material flow termination signal amount;

continuing said determination and said adding until said totalizer equals or exceeds said material flow termination signal amount;

terminating said material flow.

6. The method of claim 5 further comprising the steps of:

recording the flow rate and material flow following a flow termination signal for a plurality of batches;

analyzing said flow rate and material flow for said plurality of batches;

determining that latter ones of said batches have an increasing amount of material flow following said flow termination signal for a comparable flow rate than do prior ones of said batches; and generating an output signal indicating a possible malfunction of said flow control means representing an increased operation time of said flow control means following a receipt of said flow termination signal.

7. The method of claim 5 wherein said step of activating a control means includes the step of opening a valve.

8. The method of claim 5 wherein said step of activating a control means includes the step of activating a pump.

9. The method of claim 4 wherein said step of determining an estimated overfill amount for each one of said n batches comprises the further steps of:

computing the standard deviation of said ratios;

inputting a bias factor B; multiplying said bias factor B by said standard deviation to obtain a product value;

adding said product value to said average of said ratios to obtain a sum value;

multiplying said sum value by said measured flow rate to obtain an estimated material overfill amount that deviates from the target amount in proportion to bias factor B.

10. The method of claim 9 wherein said step of determining an amount of material overfill further comprises the steps of:

specifying flow rates of different magnitudes;

fitting a polynomial of an order of at least 2 from said measured flow rates to said measured material overfill amounts where said polynomial is of the form $a+bx+cx^2+dx^3+\ldots$;

computing the mean squared-error of the polynomial fit;

inputting said bias factor B;

multiplying B by said mean squared-error to obtain a product;

adding said product to the constant term a of said polynomial;

using said polynomial to estimate said material overflow with increased precision for each of said specified flow rates.

11. The method of claim 1 wherein said step of terminating includes the step of closing a valve to terminate said material flow.

12. The method of claim 1 wherein said step of terminating includes the step of controlling a pump to terminate said material flow.

13. A method of operating a material delivery system for delivering material from a material source to a material destination, said system comprising the steps of:

running n batches in which material is delivered from said source to said destination;

measuring the flow rate of said material for each one of said n batches during the running of each one of said n batches where the measured flow rate can be of any value;

measuring the material overfill amount for each batch of said n batches during the running of each batch;

accumulating and recording data including the measured flow rate for each one of said n batches and the measured amount of material overfill for each one of said n batches;

running at least one subsequent batch;

specifying a target amount of material to be delivered for said at least one subsequent batch;

measuring the flow rate for said at least one subsequent batch during the running of said at least one subsequent batch, where said measured flow rate for said at least one subsequent batch can be of any value;

using said recorded data and said measured flow rate for said at least one subsequent batch to determine the estimated material overfill amount for said measured flow rate for said at least one subsequent batch;

subtracting said estimated material overfill amount for said at least one subsequent batch from said target amount to derive a material flow termination signal amount; and terminating said material flow in response to the deriving of said termination signal amount to deliver said target amount of material to said destination;

wherein step of determining an estimated overfill amount for said plurality of n batches further comprises the steps of:

dividing the material overfill amount for each batch of said n batches by the measured flow rate for each of said n batches to determine a ratio for each of said n batches;

storing the ratio for each of said n batches;

computing the average of said stored ratios; and wherein said step of determining said estimated overfill for said subsequent batch comprises the step of using said average to obtain said estimated material overfill amount for said subsequent batch by multiplying said average of said ratios by said measured flow rate for said subsequent batch.

14. A method of operating a material delivery system for delivering material from a material source to a material destination, said system comprising the steps of:

running n batches in which material is delivered from said source to said destination;

measuring the flow rate of said material for each one of said n batches during the running of each one of said n batches where the measured flow rate can be of any value;

measuring the material overfill amount for each batch of said n batches during the running of each batch;

accumulating and recording data including the measured flow rate for each of said n batches and the measured amount of material overfill for each of said n batches;

running at least one subsequent batch;

specifying a target amount of material to be delivered for said at least one subsequent batch;

measuring the flow rate for said at least one subsequent batch during the running of said at least one subsequent batch where said measured flow rate for said at least one subsequent batch can be of any value;

using said recorded data and said measured flow rate for said at least one subsequent batch to determine the estimated material overfill amount for said measured flow rate for said at least one subsequent batch;

subtracting said estimated material overfill amount for said at least one subsequent batch from said target amount to derive a material flow termination signal amount; and terminating said material flow in response to the deriving of said termination signal amount to deliver said target amount of material to said destination;

wherein step of determining an estimated overfill amount for each batch of said plurality of n batches further comprises the steps of:
for each batch of said plurality of n batches, dividing the material overfill amount for each batch by the flow rate for each batch to determine a ratio for each batch;
storing the ratio for each of said n batches;
computing the average of said stored ratios;
wherein said step of determining said estimated overfill amount for said subsequent amount comprises the step of using said average to obtain said estimated material overfill amount for said subsequent batch by multiplying the average of said ratios by said measured flow rate for said subsequent batch;
wherein said step of running said subsequent batch comprises the steps of:
activating a control means to start the flow of said material from said source to said destination;
repeatedly measuring the flow rate of said material at predetermined time increments;
determining an incremental material delivered flow amount by multiplying said flow rate by a said time increment;
adding said incremental material delivered flow amount to a totalizer;
estimating the material overfill for said measured flow rate by multiplying the measured flow rate by said average of said ratios;
subtracting said estimated material overfill from said material target amount to derive said material flow termination signal amount;
continuing said determination and said adding until said totalizer equals or exceeds said material flow termination signal amount;
terminating said material flow.

15. The method of claim 14 further comprising the steps of:
recording the flow rate and material flow following a flow termination signal for a plurality of batches;
analyzing said flow rate and material flow for said plurality of batches;
determining that latter ones of said batches have an increasing amount of material flow following said flow termination signal for a comparable flow rate than do prior ones of said batches; and
generating an output signal indicating a possible malfunction of said flow control means representing an increased operation time of said flow control means following a receipt of said flow termination signal.

16. The method of claim 14 wherein said step of activating a control means includes the step of opening a valve.

17. The method of claim 14 wherein said step of activating a control means includes the step of activating a pump.

18. A method of operating a material delivery system for delivering material from a material source to a material destination, said system comprising the steps of:
running n batches in which material is delivered from said source to said destination;

measuring the flow rate of said material for each one of said n batches during the running of each one of said n batches;

measuring the material overfill amount for each batch of said n batches during the running of each batch;

accumulating and recording data including the measured flow rate for each of said n batches and the measured amount of material overfill for each of said n batches;

running at least one subsequent batch;

specifying a target amount of material to be delivered for said at least one subsequent batch;

measuring the flow rate for said at least one subsequent batch during the running of said at least one subsequent batch where said measured flow rate for said at least one subsequent batch can be of any value; using said recorded data and said measured flow rate for said at least one subsequent batch to determine the estimated material overfill amount for said measured flow rate for said at least one subsequent batch;

subtracting said estimated material overfill amount for said at least one subsequent batch from said target amount to derive a material flow termination signal amount; and terminating said material flow in response to the deriving of said termination signal amount to deliver said target amount of material to said destination;

wherein step of determining an estimated overfill amount for said plurality of n batches further comprises the steps of:
dividing the material overfill amount for each batch of said n batches by the measured flow rate for each of said n batches to determine a ratio for each of said n batches;
storing the ratio for each of said n batches;
computing the average of said stored ratios; and
wherein said step of determining said estimated overfill for said subsequent batch comprises the step of using said average to obtain said estimated material overfill amount for said subsequent batch by multiplying said average of said ratios by said measured flow rate for said subsequent batch;

wherein said step of determining an estimated overfill amount further comprises the steps of:

computing the standard deviation of said ratios;

inputting a bias factor B; multiplying said bias factor B by said standard deviation to obtain a product value;

adding said product value to said average of said ratios to obtain a sum value;

multiplying said sum value by said measured flow rate to obtain an estimated material overfill amount that deviates from the target amount in proportion to bias factor B.

19. The method of claim 18 wherein said step of determining the amount of material overfill further comprises the steps of:

specifying flow rates of different magnitudes;

fitting a polynomial of an order of at least 2 from said measured flow rates to said measured material overfill amounts where said polynomial is of the form $a+bx+cx^2+dx^3+\ldots$;

computing the mean squared-error of the polynomial fit;

inputting said bias factor B;

multiplying B by said mean squared-error to obtain a product;

adding said product to the constant term a of said polynomial;

using said polynomial to estimate said material overflow with increased precision for each of said specified flow rates.

* * * * *